(12) United States Patent
Chalin et al.

(10) Patent No.: US 8,522,933 B2
(45) Date of Patent: Sep. 3, 2013

(54) ADJUSTABLE RUN HEIGHT LIFT AXLE SUSPENSION SYSTEM

(75) Inventors: Thomas N. Chalin, Fairview, TX (US); Cully B. Dodd, McKinney, TX (US); Herbert D. Hudson, McKinney, TX (US)

(73) Assignee: Watson & Chalin Manufacturing, Inc., McKinney, TX (US)

(*) Notice: Subject to any disclaimer, the term of this patent is extended or adjusted under 35 U.S.C. 154(b) by 1582 days.

(21) Appl. No.: 11/695,587

(22) Filed: Apr. 2, 2007

(65) Prior Publication Data
US 2007/0170685 A1 Jul. 26, 2007

Related U.S. Application Data

(62) Division of application No. 11/039,051, filed on Jan. 20, 2005.

(51) Int. Cl.
*B62D 61/12* (2006.01)

(52) U.S. Cl.
USPC .......................................... 188/266; 280/86.5

(58) Field of Classification Search
USPC ............... 188/266; 280/86.5, 124.135, 43.7, 280/43.18, 43.23, 6.15, 6.157, 5.514, 209; 267/62.28, 64.27
See application file for complete search history.

(56) References Cited

U.S. PATENT DOCUMENTS

| | | | |
|---|---|---|---|
| 3,613,513 A * | 10/1971 | Johnson | 92/48 |
| 3,628,461 A * | 12/1971 | Plasser et al. | 104/17.1 |
| 3,683,753 A * | 8/1972 | Johnson | 92/48 |
| 3,834,501 A * | 9/1974 | Adachi | 192/70.28 |
| 3,912,293 A | 10/1975 | Harbers | |
| 4,300,787 A | 11/1981 | Vandenberg | |
| 4,504,080 A | 3/1985 | VanDenberg | |
| 4,553,545 A * | 11/1985 | Maass et al. | 606/198 |
| 4,573,704 A | 3/1986 | VanDenberg et al. | |
| 4,684,142 A | 8/1987 | Christenson | |
| 4,783,096 A | 11/1988 | Ramsey et al. | |
| 4,848,783 A | 7/1989 | Christenson et al. | |
| 5,018,755 A | 5/1991 | McNeilus et al. | |
| 5,090,495 A | 2/1992 | Christenson | |
| 5,230,528 A | 7/1993 | Van Raden et al. | |
| 5,403,031 A | 4/1995 | Gottschalk et al. | |
| 5,505,481 A | 4/1996 | VanDenberg et al. | |
| 5,505,482 A | 4/1996 | VanDenberg | |
| 5,540,454 A | 7/1996 | VanDenberg et al. | |
| 5,597,174 A | 1/1997 | Christenson | |

(Continued)

OTHER PUBLICATIONS

Office Action for U.S. Appl. No. 11/039,051 dated Sep. 25, 2006.

(Continued)

*Primary Examiner* — Bradley King
*Assistant Examiner* — Stephen Bowes
(74) *Attorney, Agent, or Firm* — Smith IP Services, P.C.

(57) ABSTRACT

An adjustable run height lift axle suspension system includes an axle assembly, an air spring and a lift actuator. A device may be releasably attached to the axle assembly and connected to each of the air spring and the lift actuator, the device spacing the air spring away from the axle assembly. A selected one of multiple devices may be used, the suspension system having one run height when one device is releasably attached to the axle assembly and connected to each of the air spring and the lift actuator, and a different run height when another device is used. The air spring may have approximately the same operational height when the suspension system is at the different run heights.

8 Claims, 2 Drawing Sheets

(56) References Cited

U.S. PATENT DOCUMENTS

| | | |
|---|---|---|
| 5,746,441 A | 5/1998 | VanDenberg |
| 5,778,798 A | 7/1998 | VanDenberg |
| 5,791,681 A | 8/1998 | VanDenberg |
| 5,853,183 A | 12/1998 | VanDenberg |
| 5,868,418 A | 2/1999 | VanDenberg |
| 5,897,123 A | 4/1999 | Cherney et al. |
| 5,908,198 A | 6/1999 | VanDenberg |
| 5,915,705 A | 6/1999 | VanDenberg |
| 5,944,339 A | 8/1999 | McKenzie |
| 6,007,078 A | 12/1999 | Gottschalk et al. |
| 6,073,946 A | 6/2000 | Richardson |
| 6,073,947 A | 6/2000 | Gottschalk et al. |
| 6,123,347 A | 9/2000 | Christenson |
| 6,416,069 B1 | 7/2002 | Ramsey |
| 7,152,866 B2 | 12/2006 | Chalin |
| 2004/0056441 A1 | 3/2004 | Chalin |
| 2004/0256820 A1 | 12/2004 | Chalin et al. |

OTHER PUBLICATIONS

Office Action for U.S. Appl. No. 11/039,051 dated Jan. 31, 2007.
Examiner's Answer issued Jul. 28, 2009, for U.S. Appl. No. 11/039,051, 17 pages.

* cited by examiner

ADJUSTABLE RUN HEIGHT LIFT AXLE SUSPENSION SYSTEM

CROSS-REFERENCE TO RELATED APPLICATION

This application is a division of prior application Ser. No. 11/039,051 filed on Jan. 20, 2005. The entire disclosure of this prior application is incorporated herein by this reference.

BACKGROUND

The present invention relates generally to vehicle suspension systems and, in an embodiment described herein, more particularly provides an adjustable run height lift axle suspension system.

It is at times desirable to be able to change the run height of a suspension system. For example, a run height which would be appropriate for one application may not be acceptable when the suspension system is used in another application.

Unfortunately, typical suspension systems do not permit convenient adjustment of their run heights. In most cases, weldments which determine the run height of the suspension system would have to be reconfigured at great expense of time and money.

This problem is particularly troublesome in lift axle suspension systems. This is due to the added complexity of the lift mechanism, a geometry of which changes when the run height is changed.

Therefore, it may be seen that it would be desirable to be able to provide an adjustable run height lift axle suspension system.

SUMMARY

In carrying out the principles of the present invention, an adjustable run height lift axle suspension system is provided which solves at least one problem in the art. One example is described below in which the suspension system permits convenient, efficient and economical adjustment of run height.

In one aspect of the invention, an adjustable run height lift axle suspension system is provided which includes an axle assembly, an air spring for suspending a vehicle frame above the axle assembly and a lift actuator operable to lift the axle assembly relative to the vehicle frame. A device is releasably attached to the axle assembly and connected to each of the air spring and the lift actuator. The device spaces the air spring away from the axle assembly.

In another aspect of the invention, an adjustable run height lift axle suspension system includes an axle assembly, an air spring for suspending a vehicle frame above the axle assembly, a lift actuator operable to lift the axle assembly relative to the vehicle frame, and a selected one of first and second devices. The suspension system has one run height when the first device is releasably attached to the axle assembly and connected to each of the air spring and the lift actuator, and the suspension system has a different run height when the second device is releasably attached to the axle assembly and is connected to each of the air spring and the lift actuator.

In a further aspect of the invention, an adjustable run height lift axle suspension system includes an axle assembly, an air spring for suspending a vehicle frame above the axle assembly and a lift actuator operable to lift the axle assembly relative to the vehicle frame. The suspension system has multiple run heights, the air spring having approximately the same operational height when the suspension system is at different run heights.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
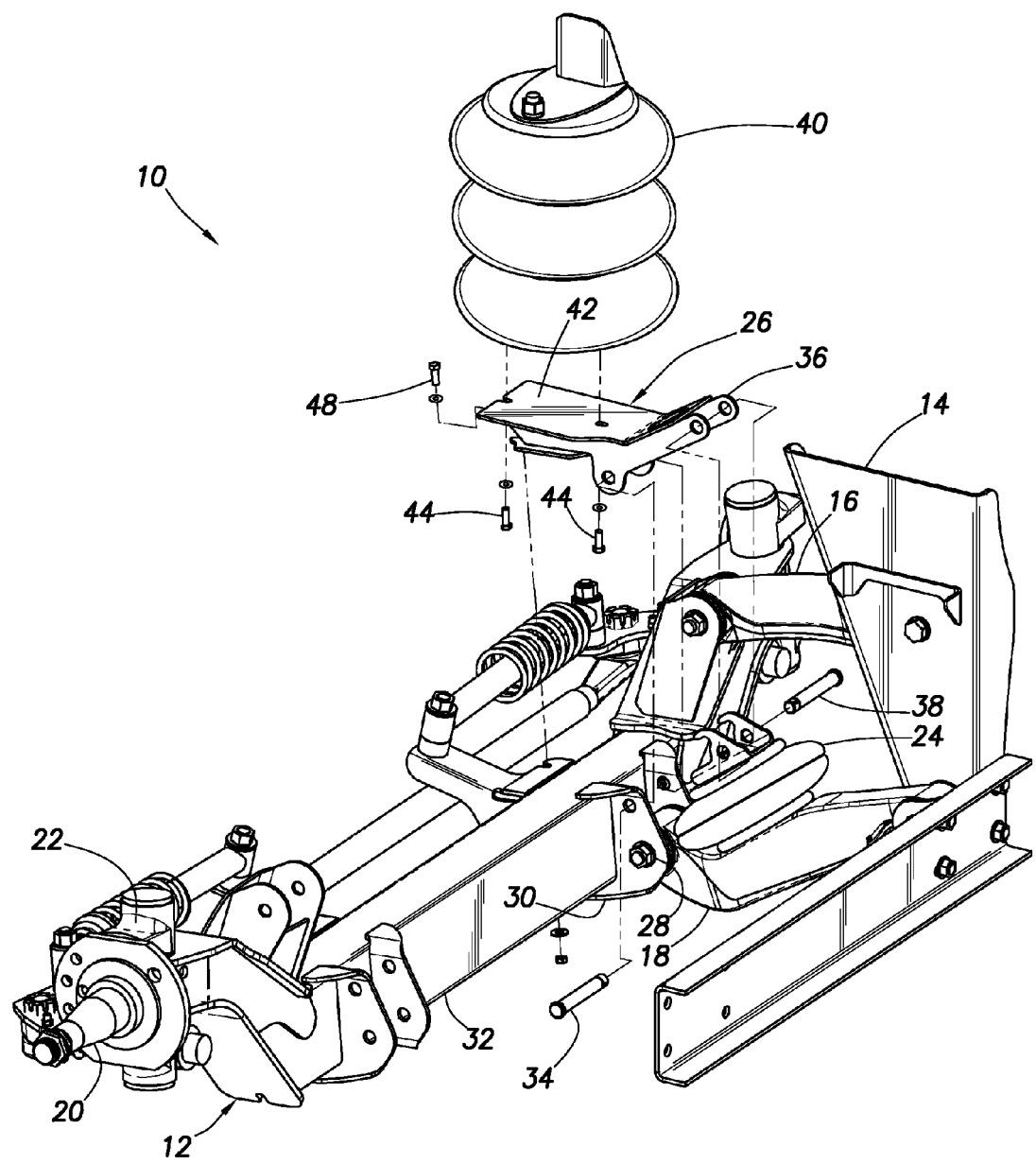
FIG. 1 is an isometric exploded view of a suspension system embodying principles of the present invention.

Representatively illustrated in FIG. 1 is an adjustable run height lift axle suspension system 10 which embodies principles of the present invention. In the following description of the suspension system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, the suspension system 10 includes an axle assembly 12 which is connected to a hanger bracket 14 by upper and lower trailing arms 16, 18. Each of the upper and lower trailing arms 16, 18 is pivotably connected to the axle assembly 12 and to the hanger bracket 14, thereby forming a parallelogram, or modified parallelogram, type of suspension system. It will be appreciated by those skilled in the art that two of the hanger brackets 14 and two each of the upper and lower trailing arms 16, 18 are provided in the suspension system 10, one of each on each lateral side of the suspension system, although for clarity of illustration only one of each is shown in FIG. 1.

The axle assembly 12 includes a spindle 20 pivotably mounted at each end of the axle assembly by a steering knuckle 22. Thus, the suspension system 10 is also a steerable type of suspension system. However, it should be understood that it is not necessary for the suspension system 10 to be steerable, or for the suspension system to be a parallelogram or modified parallelogram suspension system, in keeping with the principles of the invention.

The suspension system 10 is also liftable. A lift actuator 24 is connected between the lower trailing arm 18 and a run height adjustment device 26 in a unique manner described in further detail below. The actuator 24 is preferably a pneumatic actuator. As the actuator 24 is elongated by applying pressure thereto, the axle assembly 12 is raised relative to a vehicle frame 46 (see FIGS. 2 & 3) to thereby disengage wheel assemblies (not shown) connected to the spindles 20 from a road surface. Other types of actuators (such as, electric, hydraulic, etc.) may be used for the lift actuator 24 if desired.

The lower arm 18 is pivotably connected to the axle assembly 12 at a pivot connection 28. The pivot connection 28 is formed at a bracket 30 rigidly attached (such as by welding) to an axle 32 of the axle assembly 12. Note that the device 26 is also releasably attached to the bracket 30 by means of a conveniently detachable fastener 34.

The lift actuator 24 is pivotably connected to a forwardly projecting portion 36 of the device 26 using another conveniently detachable fastener 38. Thus, it will be appreciated that the device 26 may be readily detached from both the lift actuator 24 and the bracket 30 when desired. When the lift actuator 24 elongates, it applies an upwardly directed force to the portion 36 of the device 26 and a downwardly directed force to the lower arm 18, thereby pivoting the lower arm downward about the pivot connection 28, and lifting the axle assembly 12.

Note that the lower arm 18 at each of its ends is positioned laterally inward relative to the upper arm 16. This positioning permits convenient locating of the lift actuator 24, bracket 30 and device 26 as depicted in FIG. 1. However, other relative positions between the upper and lower arms 16, 18 may be used in keeping with the principles of the invention.

An air spring 40 is mounted to an upper platform 42 of the device 26 using conveniently detachable fasteners 44. The air spring 40 suspends the vehicle frame 46 above the axle assembly 12. Air pressure is exhausted from the air spring 40 when the lift actuator 24 is elongated, thereby permitting the axle assembly 12 to be lifted toward the frame 46.

The device 26 is also releasably attached to the axle 32 using a conveniently detachable fastener 48. Thus, it will be appreciated that the device 26 may be readily detached from both the air spring 40 and the axle 32. In addition, note that the bracket 30 efficiently and economically provides an attachment for each of the lower arm 18, the device 26 and thereby the air spring 40 and lift actuator 24 to the axle 32, which also desirably reduces a weight of the suspension system 10 as compared to the use of multiple brackets or other attachments for these components.

The device 26 spaces the air spring 40 vertically away from the axle 32. In one important feature of the suspension system 10, the vertical distance by which the device 26 spaces the air spring 40 away from the axle 32 may be conveniently changed to thereby conveniently adjust a run height of the suspension system. As used herein, the term "run height" is used to indicate a vertical distance between a center of the spindle 20 and the vehicle frame 46.

Figure 3:
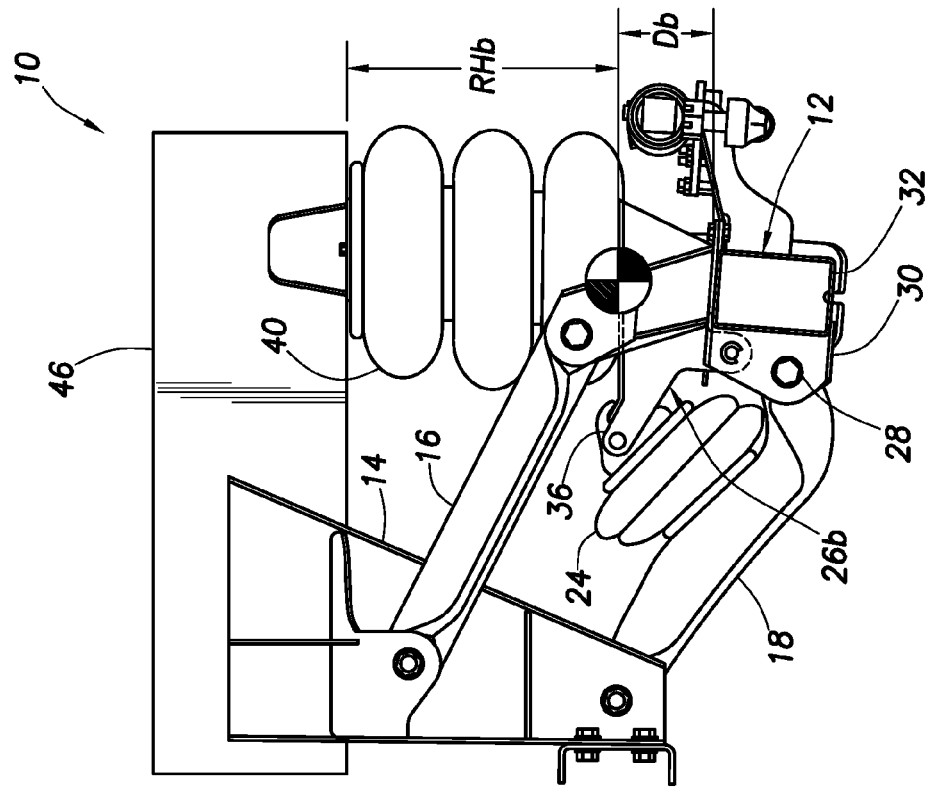
FIG. 3 is a side view of the suspension system of FIG. 1 configured to have a second run height.
Figure 2:
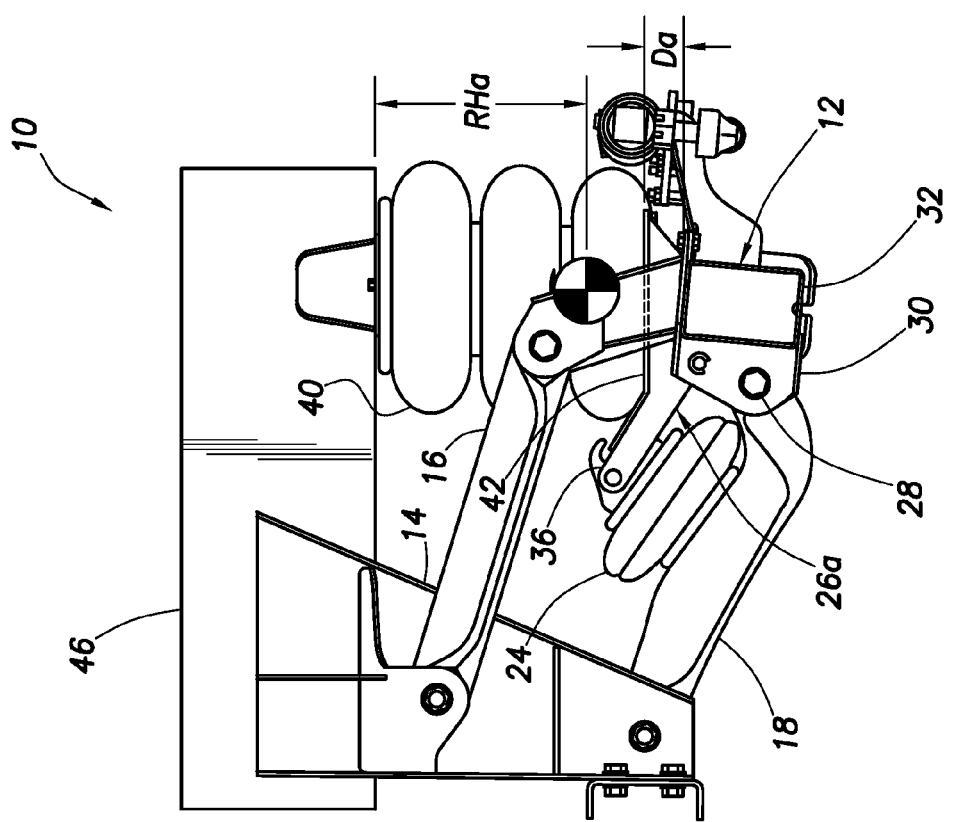
FIG. 2 is a side view of the suspension system of FIG. 1 configured to have a first run height.

Referring additionally now to FIGS. 2 & 3, the suspension system 10 is depicted in two alternate configurations. Note that in FIG. 2 the suspension system 10 has a run height RHa, and that in FIG. 3 the suspension system has an increased run height RHb. Additional configurations are possible and are conveniently provided for using the principles of the invention, as described in further detail below.

In another important feature of the suspension system 10, the run heights RHa, RHb differ without changing, or without substantially changing, an operational height of the air spring 40. Thus, the same air spring 40 may be used for each configuration of the suspension system 10, thereby eliminating the cost of maintaining multiple different air springs in inventory for the different configurations. The operational height of the air spring 40 is the height of the air spring when the suspension system 10 is at its designed run height RHa or RHb.

In FIG. 2, the device 26a spaces the air spring 40 away from the axle 32 a vertical distance Da, thereby producing the run height RHa. In FIG. 3, the device 26b spaces the air spring 40 away from the axle 32 an increased vertical distance Db, thereby producing the increased run height RHb. In yet another important feature of the suspension system 10, the device 26a may be conveniently substituted for the device 26b (or vice versa), or for another device which spaces the air spring 40 away from the axle 32 a different vertical distance, due in part to the manner in which the device is releasably connected to the air spring, axle, bracket 30 and lift actuator 24.

In still another important feature of the suspension system 10, the pivotable connection between the lift actuator 24 and the devices 26a, 26b allows the change in geometry between the FIGS. 2 & 3 configurations to be accommodated without requiring use of a different lift actuator. Thus, the same lift actuator 24 may be used for each configuration of the suspension system 10, thereby eliminating the cost of maintaining multiple different lift actuators in inventory for the different configurations.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A method of adjusting a run height of a lift axle suspension system, the method comprising the steps of:
   providing the suspension system including an axle assembly, an air spring for suspending a vehicle frame above the axle assembly, and a lift actuator operable to lift the axle assembly relative to the vehicle frame;
   selecting a run height adjustment device from at least two interchangeable run height adjustment devices which produce respective different run height dimensions; and
   attaching the selected run height adjustment device to each of the axle assembly, the air spring and the lift actuator, wherein a first one of the devices is configured to space the air spring away from the axle assembly a first distance, and a second one of the devices is configured to space the air spring away from the axle assembly a second distance different from the first distance, thereby adjusting the run height of the suspension system.

2. The method of claim 1, wherein the attaching step further comprises pivotably connecting the lift actuator to the device.

3. The method of claim 1, further comprising the step of interconnecting the lift actuator between the device and a lower arm pivotably connected to the axle assembly, the lower arm being positioned laterally inward relative to an upper arm pivotably connected to the axle assembly.

4. The method of claim 3, further comprising the step of releasably attaching the device to a bracket, a pivot connection being formed between the lower arm and the axle assembly at the bracket.

5. A method of adjusting a run height of a lift axle suspension system, the method comprising the steps of:
   providing the suspension system including an axle assembly, an air spring for suspending a vehicle frame above the axle assembly, and a lift actuator operable to lift the axle assembly relative to the vehicle frame;
   selecting a run height adjustment device from at least two interchangeable run height adjustment devices which produce respective different run height dimensions; and attaching the selected run height adjustment device to each of the axle assembly, the air spring, and the lift actuator, wherein a first one of the devices is configured to space the air spring away from the axle assembly a first distance, and a second one of the devices is configured to space the air spring away from the axle assembly a second distance different from the first distance, thereby adjusting the run height of the suspension system, and wherein an approximate same operational height of the air spring is maintained whether the air spring is spaced away from the axle assembly the first or second distance by the respective first or second device.

6. The method of claim 5, wherein the attaching step further comprises pivotably connecting the lift actuator to the device.

7. The method of claim 5, further comprising the step of interconnecting the lift actuator between the device and a lower arm pivotably connected to the axle assembly, the lower arm being positioned laterally inward relative to an upper arm pivotably connected to the axle assembly.

8. The method of claim 7, further comprising the step of releasably attaching the device to a bracket, a pivot connection being formed between the lower arm and the axle assembly at the bracket.

* * * * *